United States Patent [19]

Hessman et al.

[11] Patent Number: 5,032,049
[45] Date of Patent: Jul. 16, 1991

[54] INDEXABLE CUTTING INSERT

[75] Inventors: Anders B. I. Hessman, Sandviken; Leif R. Nyström, Järbo, both of Sweden

[73] Assignee: Sandvik AB, Sandviken, Sweden

[21] Appl. No.: 262,744

[22] Filed: Oct. 26, 1988

[30] Foreign Application Priority Data

Oct. 26, 1987 [SE] Sweden ............................. 8704153

[51] Int. Cl.$^5$ ............................................. B23P 15/28
[52] U.S. Cl. .................................. 407/113; 407/114; 407/115; 407/116
[58] Field of Search ................ 407/113, 114, 115, 116

[56] References Cited

U.S. PATENT DOCUMENTS

| | | |
|---|---|---|
| 3,487,515 | 1/1970 | Contrucci . |
| 3,557,416 | 1/1971 | Jones . |
| 3,733,664 | 5/1973 | McKelvey ........................ 407/114 |
| 3,786,540 | 1/1974 | Lundgren . |
| 4,056,871 | 11/1977 | Bator . |
| 4,056,872 | 11/1977 | Seidel . |
| 4,059,363 | 11/1977 | Romagnolo . |
| 4,616,963 | 10/1986 | Habert et al. ........................ 407/116 |

Primary Examiner—Frederick R. Schmidt
Assistant Examiner—Lawrence Cruz
Attorney, Agent, or Firm—Burns, Doane, Swecker & Mathis

[57] ABSTRACT

The invention relates to an indexable cutting insert for face milling of engine blocks of cast iron. The insert has a free surface and a clearance surface and a cutting edge extending peripherally about the insert. The corners of the insert have a relatively large radius and therefore the setting angle gets close to zero degrees during machining of the engine block when the insert gets close to the border line of the work piece. The free surface and the clearance surface enclose an acute angle and therefore the insert has a positive cutting geometry. A land is provided between the free surface and the cutting edge. The land has a width increasing towards each insert corner.

9 Claims, 4 Drawing Sheets

INDEXABLE CUTTING INSERT

BACKGROUND AND OBJECTS OF THE INVENTION

The present invention relates to an indexable cutting insert for face milling cutters, and the like of the type including a cutter body having at least one cutting insert pocket positioned at a peripheral part thereof, and being adapted for axial rotation with respect to a work piece. The insert comprises an upper surface, a lower surface and generally perpendicularly connecting side surfaces, of which two adjacent side surfaces meet in a rounded corner defined by a radius R. A peripheral land connects to the side surfaces and forms a peripheral cutting edge. The land connects at least partly to a downwardly and inwardly sloping chip surface. The corner has a bisector.

Cutting inserts for face milling which are provided with corner chamfers are previously known. A drawback of these known inserts is that the active corner chamfer has a constant setting angle during the machining of the entire work piece. At machining of engine blocks of cast iron the constant setting angle results in that the cutting insert tears material away from the work piece instead of cutting it away and therefore the surface of the work piece becomes impaired, especially at its border edges and its cylinder borings. A drawback of conventional inserts which have a strengthening land of constant width is that in the active corner of the insert, where the largest cutting forces arise, the land becomes more worn than at a distance from the corner.

One object of the present invention is to provide an indexable cutting insert which makes a clean cut also at the periphery of the work piece.

Another object of the present invention is to provide a cutting insert having maximum length of life.

Still another object of the present invention is to provide a cutting insert which demands little power to cut.

Still another object of the present invention is to provide a cutting insert which in spite of a negative basic shape achieves a positive cutting geometry.

THE DRAWINGS

The invention will be more closely described hereinafter in connection with the appended drawings.

DETAILED DESCRIPTION OF A PREFERRED EMBODIMENT OF THE INVENTION

Figure 1:
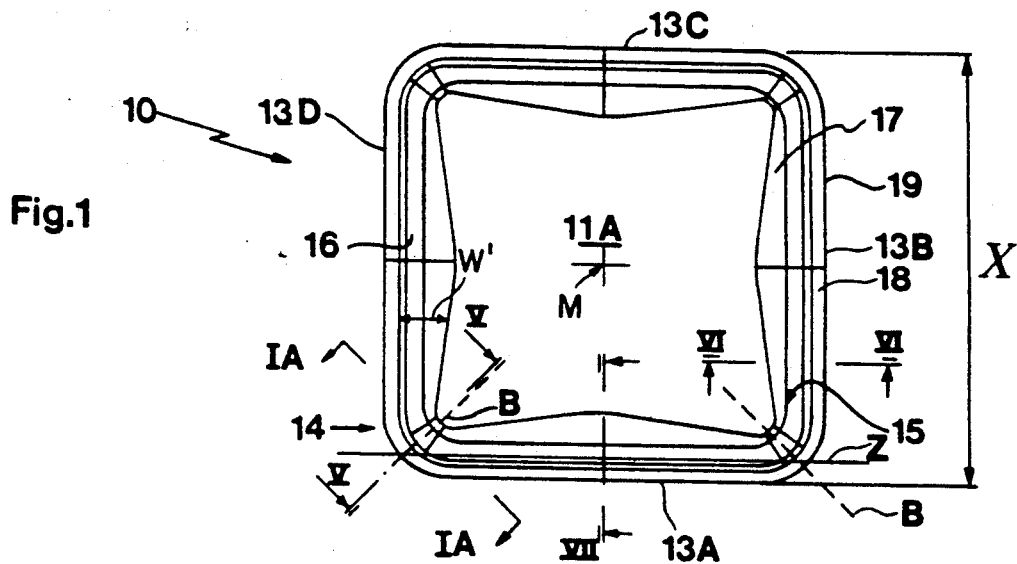
FIG. 1 shows an embodiment of the indexable cutting insert according to the present invention in a top view.
Figure 1A:
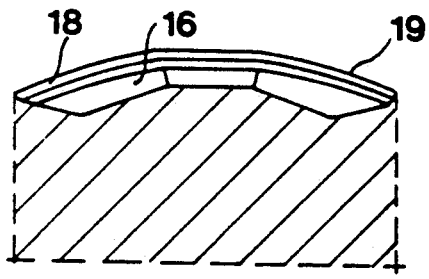
FIG. 1A shows a cross section according to the line IA—IA in FIG. 1.
Figure 2:
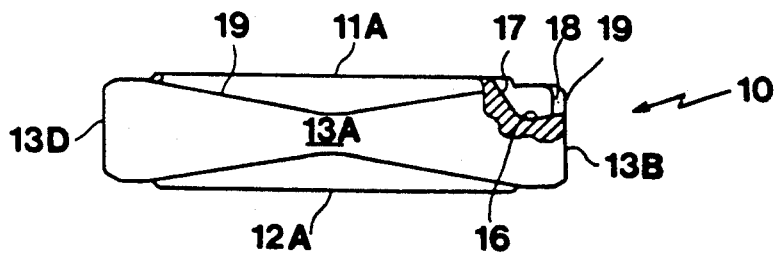
FIGS. 2 and 2A show the cutting insert in two side views.
Figure 2A:
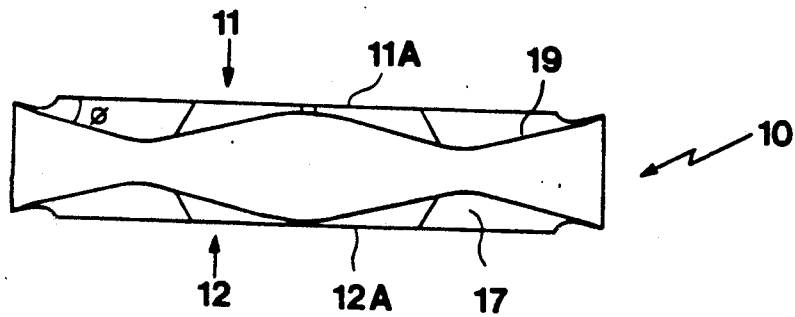
Figure 3:
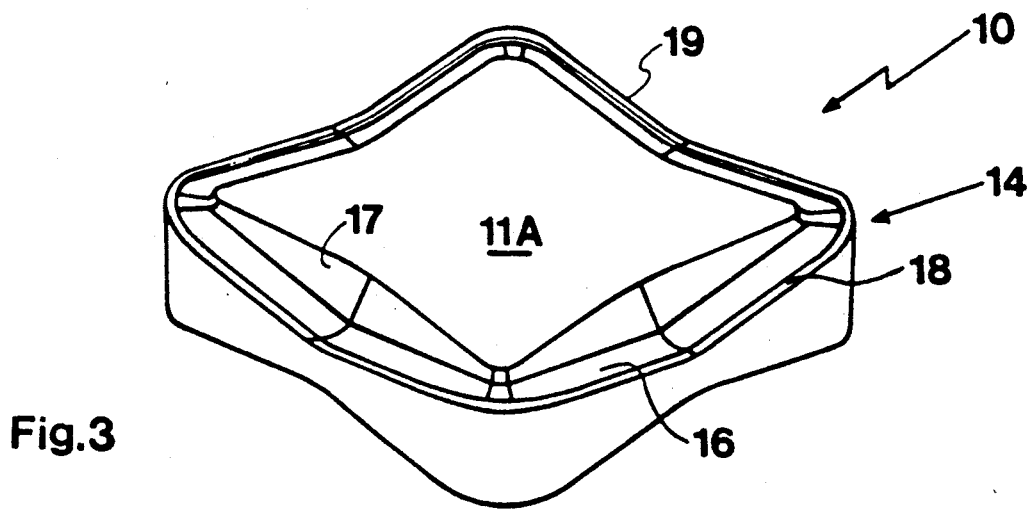
FIG. 3 shows the cutting insert in a perspective view.

FIGS. 1 to 8 show a cutting insert 10 according to the invention for chip removal machining, preferably for face milling of work pieces such as engine blocks of cast iron which are partly thin and deformation sensitive. The insert 10 is to be inserted into a cutting insert pocket positioned at a peripheral part of a milling cutter body. The milling cutter body, not shown, is adapted for axial rotation with respect to the work piece. The insert comprises two planeparallel substantially identical upper and lower surfaces 11 and 12, respectively, which are perpendicularly connected by four side surfaces 13A, 13B, 13C and 13D, i.e., the insert has a strong, negative and square shape. Two adjacent side surfaces connect to each other via a smoothly rounded corner 14. The radius R of the corner 14 is ¼ to ⅛ of the length X of the insert 10, i.e., the radius R is 2 to 5 mm or at least 4 times the tooth feed of the milling operation. A peripheral land 18 is connected to the side surfaces 13A-13D, the lines of intersection of the land and the side surfaces form the peripheral cutting edge 19. The relatively straight part of the land 18 is spaced from a straight imaginary line Z in a direction away from the center of the insert. The line Z extends between two points P, P at adjacent corners 14, each point P defined by the intersection of a corner bisector B and the cutting edge at the respective corner. A groove 15 is formed by an outer portion 16 or free surface, since the chips will never be formed against the portion 16, sloping downwardly and inwardly from the connected land and a planar inner portion 17 rising from the inner end of the outer portion 16. The land has a substantially constant width w along the major part of the substantially straight cutting edge 19. The land becomes wider at each cutting corner 14 up to the bisector B of the cutting corner. The land widens from about 0.3 mm to about 0.7 mm, preferably from about 0.45 mm to about 0.58 mm. The width w of the land is determined by the formula $$w = K \times L \cdot \cos \beta$$

where K is a factor between 1 and 3 dependent of the material to be cut, where L is a constant length of contact of the land and the chip and where $\beta$ is the angle between a normal N of the cutting edge in the corner and the flow direction A of the chip, said formula being true for a circular sector of about 45° where the bisector B forms an imaginary border line. The length of contact L is always measured parallel with the flow direction A. The land defines a rake angle $\sigma$, which can be more negative at the cutting corners than at a distance from the corner. The rake angle $\sigma_1$ (FIG. 5) along the bisector B lies within the range ±15° and the rake angle $\sigma_2$ according to the section VII—VII (FIG. 7) lies within the range ±15°. The cutting edge 19 follows a path which at the corner is parallel with the upper surface 11A and which successively slopes thereafter with increasing distance from the corner. The sloping part of the cutting edge 19 forms an acute angle $\phi$ between 5° and 20° with the plane of the upper surface 11A alternatively with the plane which defines the highest points of the insert in case the upper surface has been arranged below said plane or in case the upper surface is non-planar. The land at the corner portion has said shape in order to provide for maximum strength due to the increasing constant contact length between the chip and the land. The more positive and sloping part of the cutting edge 19 provides for smaller power requirements, i.e. the insert is subjected to smaller tangential forces during milling. The free surface 16 connects to the land 18 via a wall 16A. The wall which can be straight or curved slopes downwardly and inwardly just like the free surface. The slope of the free surface at the corner portion relative to the plane of the upper surface is defined by the angle $\epsilon_1$, which is 0° to 15°, while corresponding angles $\epsilon_2$ at a distance from the corner is 5° to 15°. The free surface 16 preferably has a constant width, inplane projection, along the straight portions of the cutting edges 19. The free surface is 20 to 50% wider in the corner portions. In the area between the straight part of the cutting edge and the curved part of the cutting edge a straight portion may be formed, which serves as a minor cutting edge during the milling operation.

The width w' of the groove 15 succesively increases from the corner 14 towards an adjacent corner, said width being largest midway between the two corners (see FIG. 1). The part of the cutting edge 19 which slopes provides for a positive axial angle for the insert in spite of the insert being neutrally and radially mounted or negatively mounted in a milling body. The groove connects to a planar mid plane 11A, 12A. The plane has the shape of a four-armed star, each said arm extending symmetrically about the bisector B of each corner. The end of each arm is truncated. The outer portion 16 or the free surface of the groove 15 can be planar, concave or broken, while the mid-portion of the groove is concave in cross section.

The side surfaces 13A–13D can be planar but preferably they have a somewhat concave shape and therefore the insert will achieve carefully defined line-shaped support surfaces abutting the site of the milling body. The support surfaces are separate from each other and are arranged in the vicinity of the insert corners 14.

The side surfaces can be provided with planar or convex chamfers which serve as support surfaces at the same time as the cutting edge of each chamfer is provided to generate the surface of the work piece.

Figure 4:
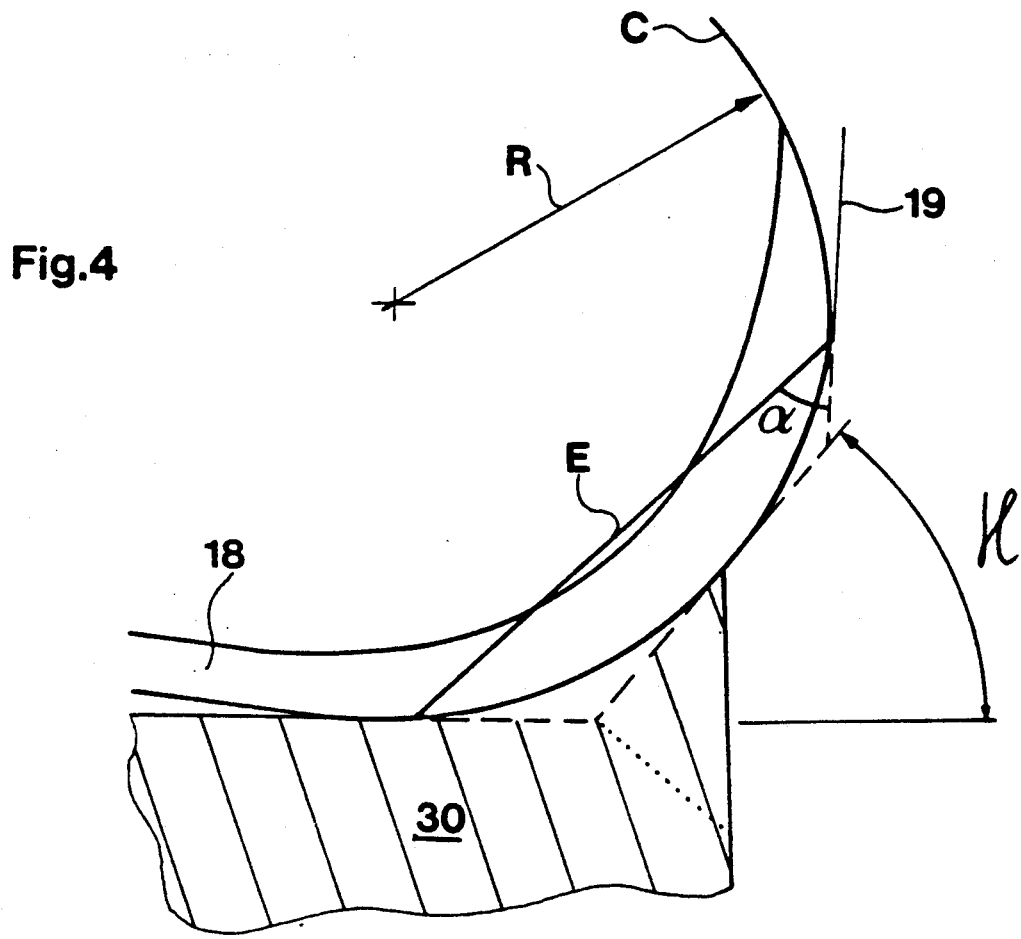
FIG. 4 shows a corner of the cutting insert according to the present invention and a corner of a conventional insert in engagement with a work piece.
Figure 5:
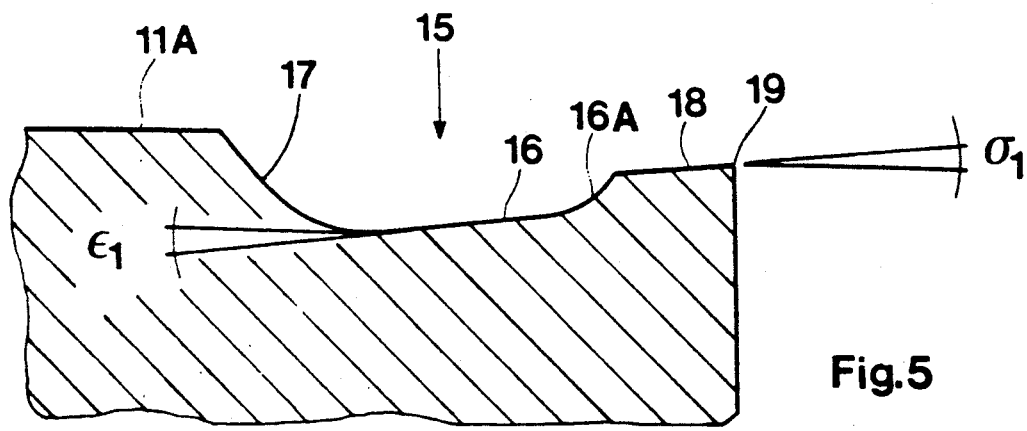
FIGS. 5 to 7 show cross sections according to the lines V—V, VI—VI and VII—VII, respectively, in FIG. 1.
Figure 6:
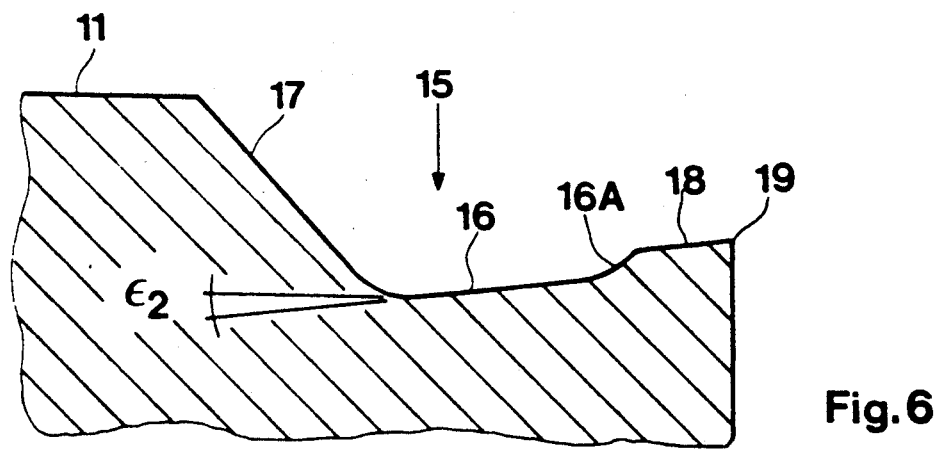
Figure 7:
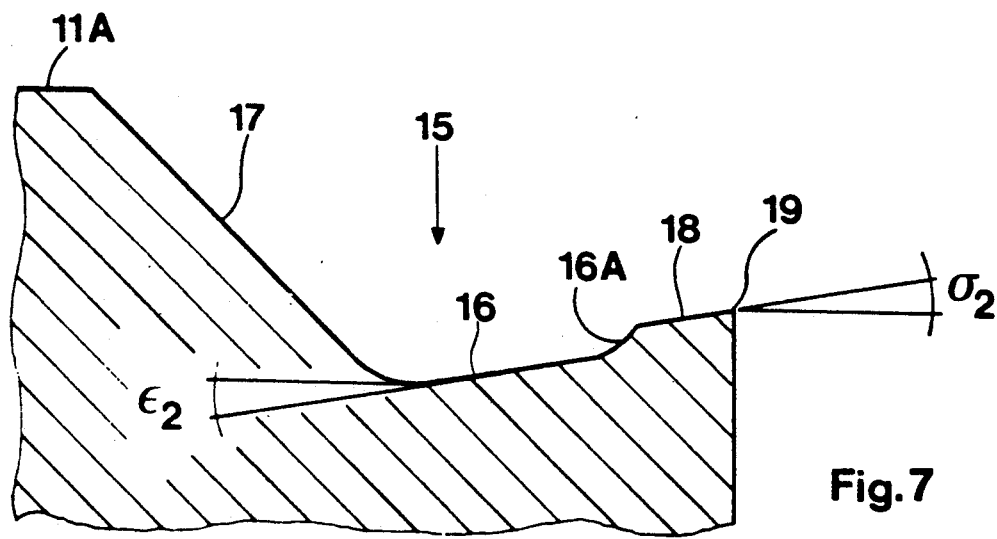

The above-mentioned corner 14 has a relatively large radius R which results in maximum spread of the cutting forces acting upon the insert from the work piece and therefore the ultimate breaking strength of the material will not be reached during the last passes in the work piece, e.g. at an external corner as shown in FIG. 4. The surface of the work piece will become planar also at the last pass. During such machining with conventional inserts having non-round corners, the last parts to be cut from the work piece will break according to the dotted line due to the large power concentration arising at sharp corners.

The setting angle K of the corner chamfer of the conventional insert is constant and the fracturing of the edge 30 of the work piece is defined by approximately the same angle. The setting angle and thus the cutting forces for the corner at the present insert decreases the more closely the insert machine the work piece's edge. Spreading of the cutting forces in the area of the cutting corner is achieved with the present insert and a lenient cutting engagement is achieved due to the positive rake angles and axial angles.

The circle C which is defined by the corner radius R is inscribed in the schematically drawn corner portion 14. The cutting edges 19 touch the circle at two points. A chord E between these points forms the angle $\alpha$, which is between 30 to 50 degrees, relative to an extension line of the cutting edge 19.

In the cross-section IA—IA is shown how the chip surface 16 varies in the cutting corner. The chip surface 16 has a local projection which serves to strengthen the corner.

Figure 8:
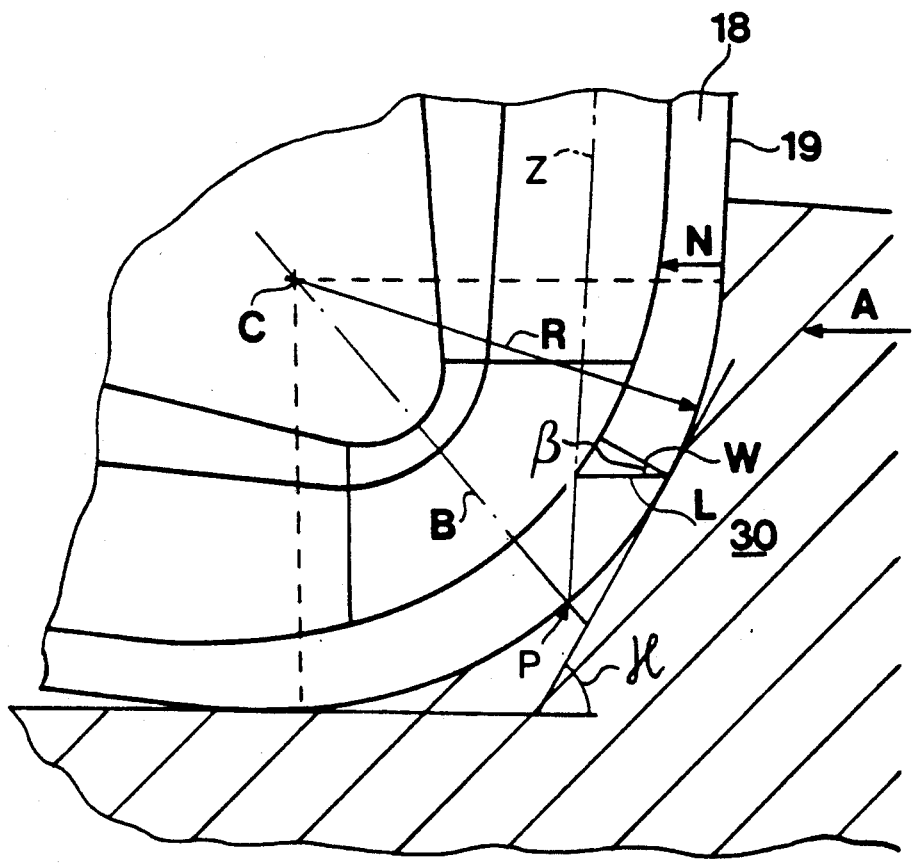
FIG. 8 shows a corner of a cutting insert according to the invention in engagement with a work piece.

In FIG. 8 is shown a corner 14 of the insert in engagement with a work piece 30. The chip flow direction is identified as A. With a setting angle K of 90 degrees the chips will flow perpendicularly over the land 18 along the area where the land has a constant width. Thus the flow direction A coincides with the normal N to the cutting edge 19. The land deflects towards the bisector B of the corner during about 45 degrees, and therefore the difference in angle between the normal N and the flow direction A successively increases. In the insert according to the present invention the land has been widened in order to achive a distinct increase of length of contact L between the chip and the land in order to strengthen the insert. In the curved part of the land the normal N coincides with the radius R. The width of the land is defined by the formula $w = K \times L \times \cos \beta$ as mentioned earlier. The cutting insert corner is symmetrically shaped about the bisector B and the curved part of the land encloses about 90 degrees, i.e. the angle between the two dotted lines in FIG. 8 is about 90 degrees where the lines meet in the center C of the radius.

In an alternative embodiment of the present invention the land in the corner area is connected to the upper surface of the insert such that the land does not have a radially inner border line in the corner area. The land and the upper surface are arranged in the same plane. The alternative embodiment is equal to the first-described insert in all other respects.

Thus the invention relates to an indexable cutting insert for chip removing machining of deformation sensitive work pieces such as face milling of engine blocks of cast iron, through which shape fracturing of the edge of the work piece is avoided and through which shape a long life for the insert is obtained.

We claim:

1. An indexable cutting insert for face milling cutters adapted to be inserted into a pocket of a cutter body arranged for rotation with respect to a workpiece, said insert comprising a substantially square-shaped body having an upper surface, a lower surface and side surfaces interconnecting said upper and lower surfaces to form rounded corners of said insert, each corner having a radius in the range of from ¼ to ⅛ of a length of said insert, said upper surface including a peripheral land intersecting said side surfaces to form a peripheral cutting edge, said cutting edge including corner portions at said corners and main portions disposed between said corners, said land having a width in a direction perpendicularly to said cutting edge, said land including corner portions disposed at said corners and main portions disposed between said corners, said upper surface including a groove formed by an inclined surface extending downwardly and inwardly from an inner edge of said land, portions of said inclined surface being situated along bisectors of said corners and extending downwardly from an inner edge of said land to a level at or below said corner portions of said cutting edge, said width of said corner portions of said land being greater than the width of said main portions of said land, said main portions of said land being spaced outwardly of a straight imaginary line extending from a point on one corner to a point on an adjacent corner, each of said points defined by the intersection of a corner bisector and a respective corner portion of said cutting edge, characterized in that the land has a width which in a corner varies according to the formula $w = K \times L \cdot \cos \beta$, where K is a factor between 1 and 3, wherein L is the constant length of contact between a chip and the land and $\beta$ is the angle between a normal N to the cutting edge at the corner and the flow direction of the chip, said formula being true for a circular sector of about 45 degrees where the bisector forms an imaginary border line.

2. Cutting insert according to claim 1, characterized in that the land has a rake angle which is constant around said insert.

3. Cutting insert according to claim 2, characterized in that the rake angle is between +15 and −15 degrees.

4. Cutting insert according to claim 1, characterized in that the radius is between 2 and 5 mm.

5. Cutting insert according to claim 1, characterized in that the land widens from about 0.3 mm to about 0.7 mm, preferably from about 0.45 to about 0.58 mm.

6. An indexable cutting insert for face milling cutters adapted to be inserted into a pocket of a cutter body arranged for rotation with respect to a workpiece, said insert comprising a substantially square-shaped body having an upper surface, a lower surface and side surfaces interconnecting said upper and lower surfaces to form rounded corners of said insert, each corner having a radius in the range of from ¼ to ⅛ of a length of said insert, said upper surface including a peripheral land intersecting said side surfaces to form a peripheral cutting edge, said cutting edge including corner portions at said corners and main portions disposed between said corners, said land having a width in a direction perpendicularly to said cutting edge, said land including corner portions disposed at said corners and main portions disposed between said corners, said upper surface including a groove formed by an inclined surface extending downwardly and inwardly from an inner edge of said land, portions of said inclined surface being situated along bisectors of said corners and extending downwardly from an inner edge of said land to a level at or below said corner portions of said cutting edge, said width of said corner portions of said land being greater than the width of said main portions of said land, said main portions of said land being spaced outwardly of a straight imaginary line extending from a point on one corner to a point on an adjacent corner, each of said points defined by the intersection of a corner bisector and a respective corner portion of said cutting edge, wherein said main portions of said cutting edge slope downwardly from each corner.

7. An indexable cutting insert for face milling cutters adapted to be inserted into a pocket of a cutter body arranged for rotation with respect to a workpiece, said insert comprising a substantially square-shaped body having an upper surface, a lower surface and side surfaces interconnecting said upper and lower surfaces to form rounded corners of said insert, each corner having a radius in the range of from ¼ to ⅛ of a length of said insert, said upper surface including a peripheral land intersecting said side surfaces to form a peripheral cutting edge, said cutting edge including corner portions at said corners and main portions disposed between said corners, said land having a width in a direction perpendicularly to said cutting edge, said land including corner portions disposed at said corners and main portions disposed between said corners, said upper surface including a groove formed by an inclined surface extending downwardly and inwardly from an inner edge of said land, portions of said inclined surface being situated along bisectors of said corners and extending downwardly from an inner edge of said land to a level at or below said corner portions of said cutting edge, said width of said corner portions of said land being greater than the width of said main portions of said land, said main portions of said land being spaced outwardly of a straight imaginary line extending from a point on one corner to a point on an adjacent corner, each of said points defined by the intersection of a corner bisector and a respective corner portion of said cutting edge, characterized in that said land has a rake angle which varies around the insert.

8. Cutting insert according to claim 6, characterized in that said main portions of said cutting edge slope downwardly at an angle of about 5 to 20 degrees.

9. An indexable cutting insert for face milling cutters adapted to be inserted into a pocket of a cutter body arranged for rotation with respect to a workpiece, said insert comprising a substantially square-shaped body having an upper surface, a lower surface and side surfaces interconnecting said upper and lower surfaces to form rounded corners of said insert, each corner having a radius in the range of from ¼ to ⅛ of a length of said insert, said upper surface including a peripheral land intersecting said side surfaces to form a peripheral cutting edge, said cutting edge including corner portions at said corners and main portions disposed between said corners, said land having a width in a direction perpendicularly to said cutting edge, said land including corner portions disposed at said corners and main portions disposed between said corners, said upper surface including a groove formed by an inclined surface extending downwardly and inwardly from an inner edge of said land, portions of said inclined surface being situated along bisectors of said corners and extending downwardly from an inner edge of said land to a level at or below said corner portions of said cutting edge, said width of said corner portions of said land being greater than the width of said main portions of said land, said main portions of said land being spaced outwardly of a straight imaginary line extending from a point on one corner to a point on an adjacent corner, each of said points defined by the intersection of a corner bisector and a respective corner portion of said cutting edge, characterized in that main portions of said inclined surface disposed along said main portions of said land are of constant width, and corner portions of said inclined surface disposed along said corner portions of said land have a width progressively decreasing toward the respective corner bisector, said corner portions of said inclined surfaces being disposed at a higher elevation than main portions of said inclined surfaces.

* * * * *